United States Patent [19]

Nogossek

[11] Patent Number: 5,362,146
[45] Date of Patent: Nov. 8, 1994

[54] PLASTIFIER WITH DISK AND PIN THROTTLE FOR PLASTIC MATERIALS

[75] Inventor: Alfred Nogossek, Salzgitter, Germany

[73] Assignee: Friedrich Theysohn GmbH, Langenhagen, Germany

[21] Appl. No.: 213,387

[22] Filed: Mar. 14, 1994

Related U.S. Application Data

[63] Continuation of Ser. No. 893,516, Jun. 3, 1992, abandoned.

[30] Foreign Application Priority Data

Jun. 3, 1991 [DE] Germany .................... 4118091

[51] Int. Cl.⁵ .................... B29B 7/30; B29B 7/48
[52] U.S. Cl. .................... 366/82; 366/85; 366/307; 425/145; 425/204; 425/208
[58] Field of Search ............ 425/203, 204, 205, 207, 425/208, 209, 382.4, 145; 366/75, 79, 80, 82, 83, 84, 85, 145, 307

[56] References Cited

U.S. PATENT DOCUMENTS

| 2,631,016 | 3/1953 | Kraffe de Laubarede | 366/145 |
| 3,169,752 | 2/1965 | Kraffe de Laubarede | 366/80 |
| 3,458,894 | 8/1969 | Wheeler | 366/80 |
| 3,870,285 | 3/1975 | Bausch et al. | 366/80 |
| 4,347,003 | 8/1982 | Anders | 366/83 |
| 4,408,887 | 10/1983 | Yamaoka | 366/75 |
| 4,629,326 | 12/1986 | Huls | 366/307 |
| 4,629,327 | 12/1986 | Capelle | 366/307 |
| 4,735,565 | 4/1988 | Capelle | 366/80 |
| 4,940,329 | 7/1990 | Dienst | 366/75 |
| 4,960,328 | 10/1990 | Schumacher et al. | 366/80 |
| 5,141,426 | 8/1992 | Capelle | 425/205 |
| 5,145,352 | 9/1992 | Capelle et al. | 425/205 |
| 5,147,198 | 9/1992 | Capelle | 425/205 |

FOREIGN PATENT DOCUMENTS

| 2197635 | 3/1974 | France . |
| 3042427A1 | 5/1982 | Germany . |
| 3841729C1 | 3/1990 | Germany . |
| 504666 | 4/1976 | U.S.S.R. | 425/382.4 |

Primary Examiner—Jay H. Woo
Assistant Examiner—Joseph Leyson
Attorney, Agent, or Firm—Herbert Dubno; Yuri Kateshov

[57] ABSTRACT

A plastifying extruder of the double-screw type, to avoid dead zones in the flow, has at its throttle location throttle disks on the screws formed with outwardly open recesses angularly equispaced on the disks. Pins distributed around the screws in the throttle region project radially into gaps between the disks and can penetrate to a greater or lesser extent into these gaps to provide a variable flow cross section.

2 Claims, 2 Drawing Sheets

PLASTIFIER WITH DISK AND PIN THROTTLE FOR PLASTIC MATERIALS

This is a continuation of co-pending U.S. application Ser. No. 07/893,516 filed on June 1992 now abandoned.

FIELD OF THE INVENTION

My present invention relates to a plastifier for plastic materials and, more particularly, to a worm or screw-type plastifier for converting particulate or scrap thermoplastic material into an extrudable melt by plastification, i.e. a combined heading and masticating and mixing operation. More specifically, the invention relates to an apparatus for plastifying synthetic resin materials which comprises two meshing worms or screws rotatable about respective axes in an elongated worm or screw housing and which is provided along the screws with at least one throttle location enabling stepless variation of flow cross section in the worm or screw housing (see "PLASTVERARBEITER" 41, Year 1990, Nr. 10, Page 140).

BACKGROUND OF THE INVENTION

As will be apparent from this publication, plastifying apparatus of this type may also be known as a double-worm extruder, a double-screw extruder, a compounding apparatus or unit and by terms of similar import. In the following discussion, I may refer to such a unit simply as an extruder.

An apparatus of this type is equipped with two worms or screws which can be driven in the same sense or in opposite senses and which can have interfitting flights or ribs, i.e. the screws can be provided adjacent one another so that they effectively interfit or mesh.

Along the path of the material to be thermoplastified along the screws and in the chambers of the housing receiving the screws, throttle locations can be provided at which a steplessly variable change in the cross section can be provided.

This change in the cross section varies the flow velocity of the material through the apparatus and, to optimize the plastification, can be modified to suit the particular material. The adjustment of the throttle can also simplify matching of the rheological conditions to the material which is processed, especially the flow characteristics and viscosities thereof. Adjustment at the throttles can allow the residence time of the material in the apparatus and the degree of filling of the material in the apparatus to be varied and thereby enable adjustment of the degree of plastification of the material.

The publication cited describes two extruders with different constructions of the throttle. One version provides a radial throttle in which slide plates can be introduced in a radial direction into the screw housing to a greater or lesser depth. Such slide plates produce dead zones in the flow of the melt which remain in the product downstream of the plates, can form residues which constitute contaminants thereof and can lead to defects in the product.

In an axial throttle version, a radial narrowing of the throttle gap is effected by axial shifting of the screw. This also varies the length of the throttle region. Because of the relatively complex shape of the screw housing and the screw and the need for axial shifting of the screw, the apparatus is inordinately expensive and more difficult to maintain.

OBJECTS OF THE INVENTION

It is, therefore, the principal object of the invention to provide a plastifying apparatus of the two-screw type which is of simple construction and can provide stepless variation of the flow cross section without the formation of dead zones.

Another object is to provide an improved apparatus of the type described which, however, is free from the drawbacks outlined above.

SUMMARY OF THE INVENTION

These objects are attained, in accordance with the invention, in an apparatus for the plastifying of a synthetic resin, thermoplastic or like plastic material or composition which comprises:
an elongated extruder housing;
a pair of meshing extruder screws rotatable in the housing in respective generally cylindrical screw-receiving chambers formed therein to advance plastic material to be plastified in a path along the screws through the housing; and
means forming a steplessly variable throttle for the plastic material along the path, the means forming the throttle including:
  at least two mutually parallel axially spaced throttle disks on the screws lying transverse to a respective axis thereof, the disks being formed along outer peripheries thereof with peripherally spaced recesses extending substantially over a full width of the respective disk, and
  a multiplicity of round cross section pins spaced apart around the screws, extending radially into a gap between the throttle disks, radially adjustable in the housing, and extending with a variable length radially into the gap.

The throttle disks of the invention provide shear-generating elements imparting a high degree of friction to the material processed and thus improve the plastification action.

In the region of these disks, the flow cross section when the pins are fully retracted is determined specifically by the recesses in the periphery of the throttle disks. A simple and rapid variation of the flow cross section is attainable by simply inserting the pins to a greater or lesser depth in the gaps between the throttle disks. In this manner I am able to achieve an extremely rapid matching of the flow cross section to the rheological characteristics including the flow characteristics and viscosity of the material processed.

Since the pins are round, i.e. of circular cross section, dead zones do not materialize even when they project fully into the gaps between the disks. A reliable passage of the melt is thereby ensured.

According to a feature of the invention, the disks have a saw-tooth profile along their peripheries and the recesses effectively separate formations of saw-tooth shape from one another.

At the throttle location two or more pairs of such disks, each defining a respective gap are provided on each screw and into each gap a multiplicity of pins can project, the pins being distributed all around the periphery of the housing.

The pins can have their inner ends tapered to screwdriver shape and can be rotatable about their respective radial axes and the diameters of the pins can range between 0.05 d and 0.5 d where d is the worm or screw diameter.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
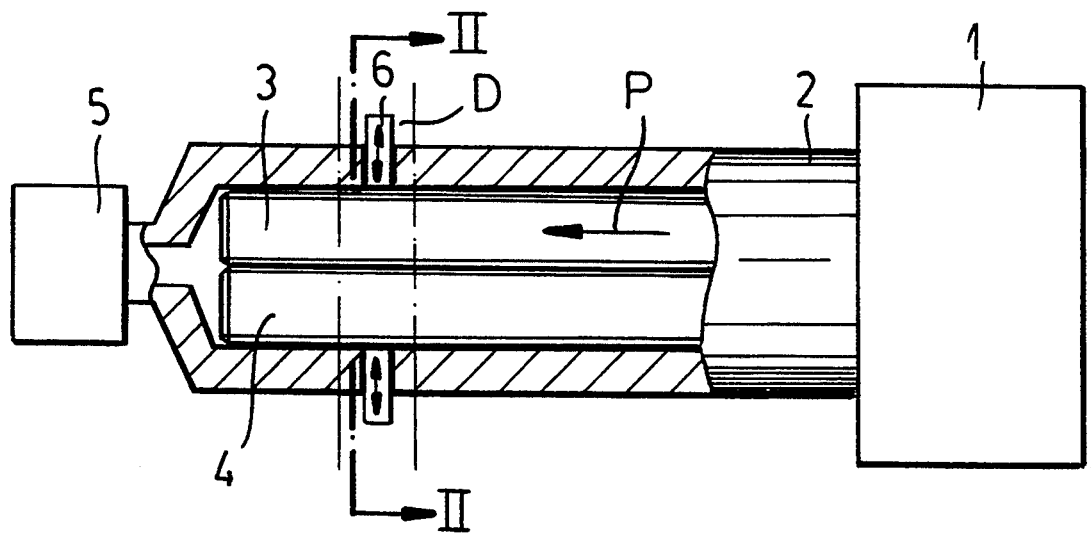
FIG. 1 is a plan view of a plastifying apparatus according to the invention, partly in axial cross section.

In FIG. 1 I have shown an extruder 1 which comprises an elongated extruder housing 2 in which two screws 3 and 4 are disposed in meshing relationship. The plastifying apparatus is thus in the form of a double-worm or double-screw extruder or compounding apparatus. The screws 3 and 4 can be rotated about the respective axes in the same sense or in opposite senses.

FIG. 1 shows only those parts of the apparatus which are important to the invention.

The plastic material is driven in the direction represented by the arrow P through the housing 2 along the screws 3 and 4 to an injection head 5. The worms can have helical flights and other forms for advancing and mixing the plastic material not shown in detail in FIG. 1 and conventional in the art. Along the path of the material along the screws 3 and 4 and within the screw housing 2, a throttle region D delimited by dot-dash lines is provided. This region has been shown in greater detail in FIG. 3.

Figure 2:
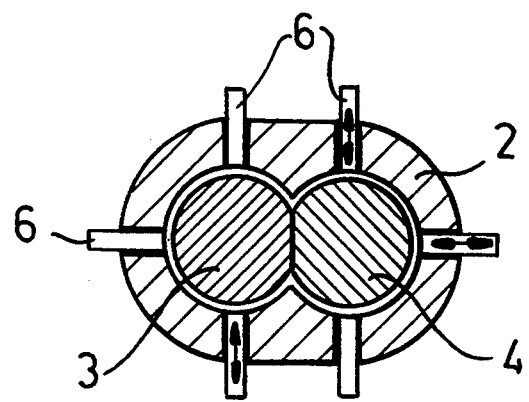
FIG. 2 is a section taken along the line II—II of FIG. 1 drawn to a larger scale.

A section through the throttle region D is shown to a larger scale in FIG. 2 and it can be seen that, in this region, pins 6 are arrayed all around the periphery of the screw housing 2, extend radially to the screws 3 and 4, and are shiftable in the radial direction and depicted by double-headed arrows. The pins 5 have a round cross section, i.e. a circular cross section, with a diameter ranging between 0.05 d and 0.5 d where d is the diameter of the worm 3 or 4 (see FIG. 3). Preferably the pins are equidistantly spaced as will be apparent from FIG. 2.

Figure 3:
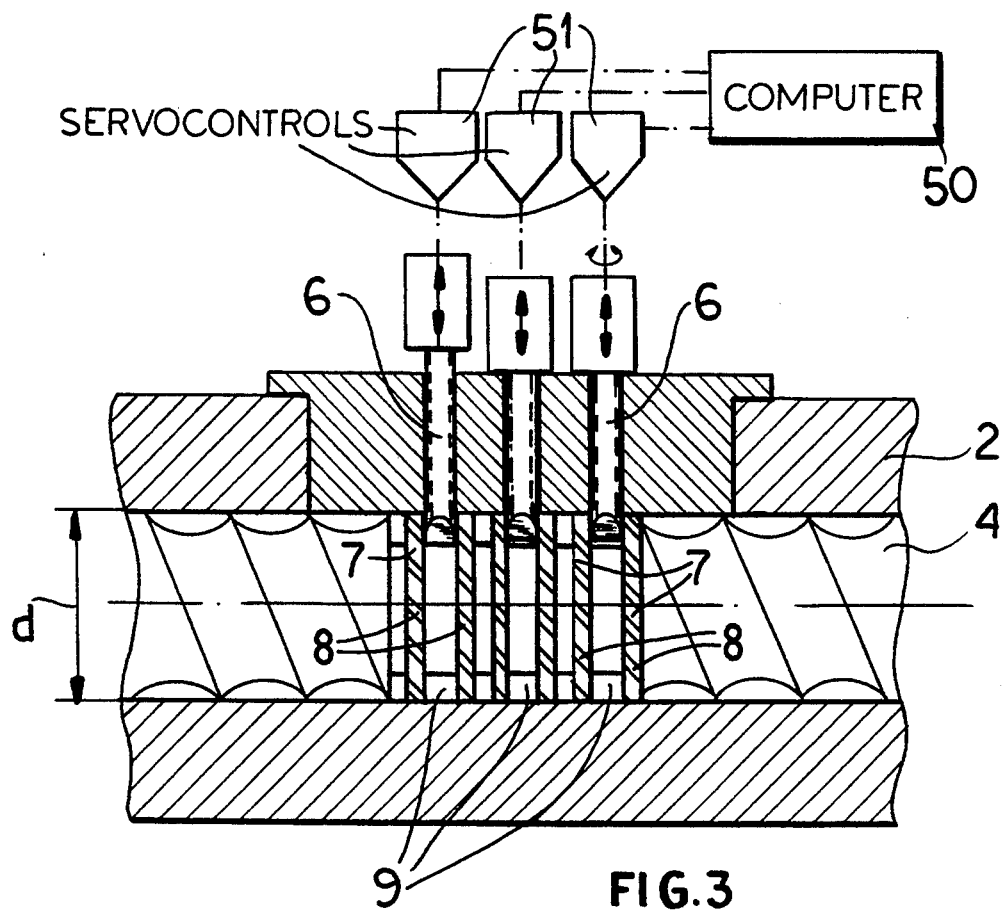
FIG. 3 is a detail of the apparatus of FIGS. 1 and 2 to still a further enlarged scale.

FIG. 3 shows only the region D along the screw 4, the screw 3 being behind screw 4 in this illustration and therefore not being visible. At the throttle region D, the screws each carry throttle disks 7 as shown for the screw 4 whose outer diameters correspond to the inner diameter of the chambers in the screw housing 2 accommodating the screws 3 and 4.

Figure 4:
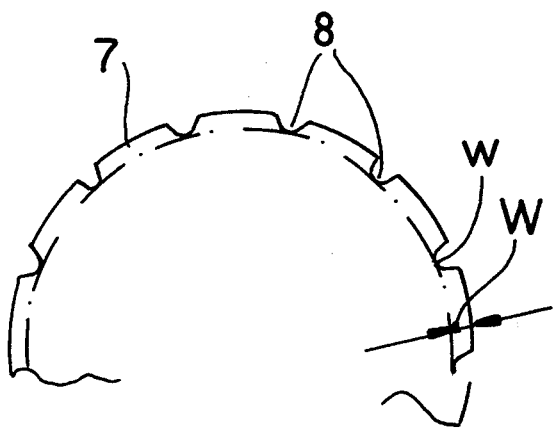
FIG. 4 is a diagram showing a throttle disk according to the invention.

The throttle disks are provided peripherally with angularly equispaced recesses 8 extending the full width of the throttle disk 7. This width is represented at W in FIG. 4 and the depth of the recess is represented at M from which it can be seen that w is approximately equal to W.

The recesses 8 can be oriented axially or, as shown in FIG. 3, can be inclined to the axis so shaped as to impart a saw-tooth profile to the periphery of the disk. Upon rotation of the worms 3 and 4, the melt is forced through the recesses 8.

In the embodiment shown, the worms 3 and 4 each have six throttle disks 7 disposed in pairs so as to define gaps 9 between them. The gaps each have a plurality of pins extending into them and, as can be seen from FIG. 3, each pin can have a width approximately equal to the axial spacing between the throttle disks 7. The gaps 9 and the pins 6 engaged therein lie in the same transverse planes perpendicular to the axis of the respective screw.

The pins 6 can be displaced radially to a greater or lesser depth in the respective gap 9 as is apparent from FIG. 3. In this Figure, the left-hand pin 6 does not penetrate into the gap 9 and is in a retracted end position. In this position it lies completely within the outline of the interior of the housing 2. The central pin 6 and the right-hand pin are both fully inserted into the respective gap 9 and thus have assumed their innermost end positions.

It is also possible to provide gaps between individual disks 7, i.e. to provide gaps alternating with the disks so that the disks need not be paired to define such gaps.

The flow cross section through the throttle region D is determined by the positions of the pins 6 as described and the positions of the pins are provided to match the flow characteristics and viscosity of the material displaced. Apart from end positions illustrated, the pins can assume any intermediate position. The pin positions can be determined by measuring characteristics or qualities of the melt, by, for example, an IR spectrometer or an on-line rheometer. The optimum values can then be set as set point values for controlling the positions of the pins to maintain the set point values, e.g. via a computer and servomotor control 50 of the position of each pin. The computer has been shown at 50 in FIG. 3 and is connected to the servocontrols 51.

The pins, because of their shapes and sizes, do not allow the formation of any dead zone in the flow of the melt and hence defects resulting form dead zones in earlier systems are avoided.

Figures 5, 5A:
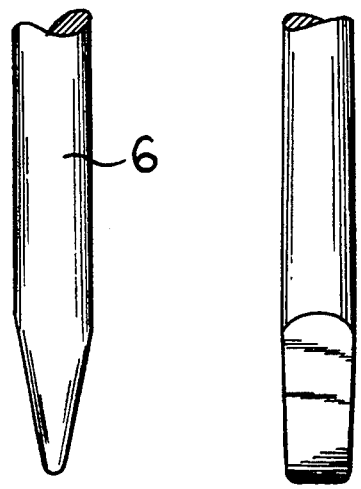
FIG. 5 is an elevational view of a pin for use in the apparatus of FIGS. 1-3.
FIG. 5A is an elevational view of the pin of FIG. 5 taken at a right angle of the view of FIG. 5.

As FIGS. 5 and 5A show, the pins can taper to a screwdriver shape formed by flat surfaces tapering inwardly inside the housing as illustrated in FIGS. 3 and 5A; or conical shape and they can be rotatable about their axis as indicated by the curved arrow in FIG. 3 so that the angular position of the blade can provide a further fine control of the flow cross section.

I claim:

1. A plastifying apparatus for plastics, said apparatus comprising:

an elongated extruder housing;

a pair of meshing extruder screws rotatable in said housing in respective generally cylindrical screw-receiving chambers formed therein to advance plastic material to be plastified in a path along said screws through said housing;

means forming a steplessly variable throttle for said plastic material along said path, said means forming said throttle including:

at least two mutually parallel axially spaced throttle disks each of on said screws lying transverse to a respective axis thereof, said disks being formed along outer peripheries thereof with a multiplicity of equispaced peripherally spaced recesses extending over a full width of the respective disk, and a multiplicity of round cross section pins spaced apart radially around said screws, extending radially through said housing and into a gap between the throttle disks, and extending with a variable length radially into the gap, said pins having widths approximately equal to the width of said gaps, said pins having two flat surfaces tapering inwardly at inner ends of the pins inside said housing to a screwdriver-blade shape, said pins being rotatable about their respective pin axes in said housing, said recesses of said disks having sawtooth configurations along the respective peripheries of said disks; and a computer and servocontrol operatively connected with said pins for controlling radial positions of each of said pins to match a flow cross section formed thereby to rheological characteristics of material to be plastified in said path.

2. The apparatus defined in claim 1 wherein said pins have diameters between 0.05 d and 0.5 d where d is the diameter of said screws.

* * * * *